June 7, 1927.  R. OPPENHEIM  1,631,642

POSITIVE ELECTRODE FOR ELECTRIC BATTERIES

Filed Jan. 3, 1925

Inventor
R. Oppenheim
By Marks Clerk
attys.

Patented June 7, 1927.

1,631,642

UNITED STATES PATENT OFFICE.

RENÉ OPPENHEIM, OF LEVALLOIS-PERRET, FRANCE, ASSIGNOR TO SOCIÉTÉ ANONYME LE CARBONE, OF LEVALLOIS-PERRET, FRANCE.

POSITIVE ELECTRODE FOR ELECTRIC BATTERIES.

Application filed January 3, 1925, Serial No. 428, and in France November 19, 1924.

In electric batteries in which a solid depolarizer is employed, such as manganese dioxide batteries, the depolarization is produced, as is well known, by the oxidizing action of the depolarizing substance, but owing to the compactness or density of this latter, which is generally agglomerated, and to the filling up of its pores by the moistening liquid which is added in order to permit of the agglomeration of the depolarizing composition, the gases which are produced during the working of the battery penetrate into and circulate with difficulty and incompletely in this depolarizing substance, so that depolarizing action is incomplete and slows down rapidly. The result is that the voltage of the battery, which is originally about 1.5 drops at the end of a short time to below 1 volt.

Furthermore, the molecules of the depolarizing substance, which have been reduced by the action of the hydrogen liberated in the course of the reaction of the battery, can no longer play any useful part. In order to regenerate these molecules which have thus become inactive, in certain types of batteries the agglomerate of manganese dioxide is provided with channels in which the outer air can circulate, this air acting only on the molecules situated on the surface of the channels so that the regeneration is very incomplete.

The present invention relates to an improvement in the manufacture of positive electrodes with a solid depolarizer for electric batteries for the purpose of remedying the disadvantages above mentioned.

This improvement consists broadly:

1. In providing for a large access of the external air to the interior of the depolarizing composition, which may for example be composed of manganese dioxide.

2. In evaporating the liquid contained in the pores of the depolarizing composition.

3. In protecting the pores of the depolarizing composition from penetration by the electrolytic liquid of the battery by an external coating composed of a material which is impermeable to liquids and permeable by gases, such as a pectized colloid.

By this improvement, the pores of the manganese dioxide depolarizing composition do not contain any liquid capable of interfering with the free circulation of gases through this composition. The result is therefore that on the one hand all the particles of manganese dioxide are in contact with the gases produced by the reaction of the battery and thus, participate in the depolarization, and on the other hand, all these particles are in contact with the oxygen of the outer air, so that the particles of manganese dioxide which have been reduced are immediately regenerated.

In this way the manganese dioxide produces a much more complete depolarization, and is enabled to fulfill its depolarizing action for a much longer time during the use of the battery, with the result that the drop in the voltage of the battery is retarded and the capacity of the battery, for the same weight of manganese dioxide is augmented.

By way of example, various methods of carrying out the invention will be described hereafter with reference to the accompanying drawing in which—

Figure 1:
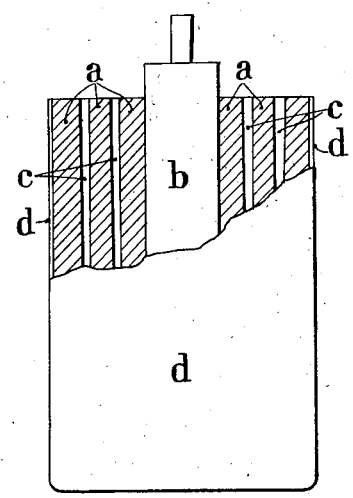
Fig. 1 shows in elevation and partly in section one form of the invention in case the depolarizer is compressed on the carbon electrode.
Figure 2:
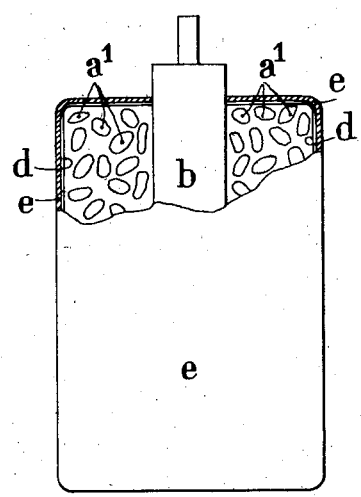
Figs. 2, 3 and 4 illustrate other forms of the invention in case a solid depolarizer in grains is used.
Figure 3:
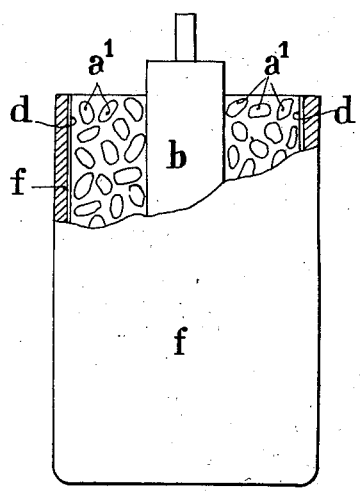

In the method of execution illustrated in Fig. 1, the depolarizing composition is first prepared by mixing for example, 10 kg. of manganese dioxide, 5 kg. of plumbago and 1 kg. of wood charcoal and moistening this mixture with a concentrated solution of ammonium chloride. This depolarizing composition $a$ is tightly compressed around the carbon positive electrode $b$ and in the agglomerate thus obtained there are formed vertical channels $c$ so arranged as to facilitate the access of air into whole thickness of this agglomerate. The positive carbon and its depolarizing agglomerate are then subjected to a stoving at a temperature of 150° C. approximately and this stoving is prolonged until the moistening liquid is completely evaporated.

While the agglomerate is still hot it is plunged into a pectizable colloidal solution such as is described in the applicant's prior patent applications Sal. No. 571,926 of the 30th June, 1922, and Sal. No. 669,625 of the 19th October, 1923, for example into a colloidal solution of arrow-root fecula. Under the action of the heat retained by the agglomerate and of the augmentation of the porosity of this latter due to its drying, the colloidal solution becomes pectized on contact with the agglomerate and forms an adherent coating $d$ which is permeable by gases and impermeable by liquids. This colloidal coating instead of being obtained by immersion, as just described, may likewise be obtained by being coated on.

The manganese dioxide electrode thus obtained is dry, porous, impermeable by the liquid electrolytic solution of the battery and is highly accessible to the gases produced by the action or working of the battery and to the outer air. In consequence thereof it possesses the property of producing depolarization of the battery both by the oxidizing action of the manganese dioxide and by its power of absorption, and of permitting the regeneration of the manganese dioxide which has been reduced by the oxidizing action of the outer air.

In carrying out the present invention the evaporation of the moistening liquid, instead of being effected by stoving, may be effected by a more or less prolonged exposure to the atmosphere, either before or after the application of the colloidal coating; in this we should employ for example either a colloid which pectizes rapidly in contact with the air, or a colloidal which has been pectized previously. It is employed for example collodion in the first case and cellophane in the second case, the uses of which for the same purpose have been already described in the applicant prior patent application Sal. No. 634,857 of the 26th April, 1923.

It is obvious that the positive electrodes and their depolarizing agglomerates prepared according to the present process, may be constructed in various forms and that the proportions and the nature of the constituent elements of the depolarizing agglomerate may vary. In certain cases one may dispense with the wood charcoal or the plumbago in the preparation of the agglomerate.

The subject matter of the present invention may also be applied in cases where the solid depolarizer, composed of manganese dioxide for example, is used in a state of subdivision in the form of pieces or powder. This depolarizer $a'$ is then contained either in a bag $e$ which will allow the outer air to pass through it or in a porous pot $f$ open at its upper part. In this case the porous vessel not being a conductor of electricity, the colloidal coating $d$ must be placed inside this vessel so as to be in contact directly with the pieces or powder of manganese dioxide.

Under these circumstances, the electric conductivity between the electrolyte and the depolarizing substance is ensured by the electrolytic liquid contained in the pores of the porous vessel and by the electrolytic salts which have penetrated by osmosis into the colloidal coating.

Figure 4:
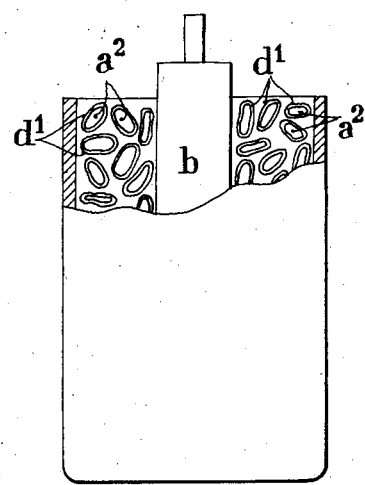

Instead of applying the colloidal coating to the vessel the pieces or grains of powder of the depolarizing substance may be rendered impermeable by intimately mixing with the pieces or grains of powder a colloidal suspension capable of being pectized according to the process described in the applicant prior patent application Sal. No. 705,684 of the 10th April, 1924, by subsequently producing by suitable means the pectization of this suspension in such a way that every piece or grain $a^2$ of powder Fig. 4 of the depolarizing substance shall be individually covered or coated with a pectized pellicle $d''$ which is impervious to liquids and permeable by gases.

Claims:

1. A process of manufacturing positive electrodes with an agglomerated depolarizer for electric batteries consisting in preparing a depolarizing composition by mixing manganese dioxide, plumbago and wood charcoal, moistening the said mixture with a concentrated solution of ammonium chloride, compressing this composition tightly around the carbon positive electrode, forming in this agglomerate channels designed to permit of the access of the outer air to the interior of the depolarizing composition, evaporating the liquid with which this latter is moistened, covering the external surface of the depolarizing agglomerate with a colloidal pectized coating.

2. A process of manufacturing positive electrodes with a solid depolarizer comprising preparing a depolarizing composition by mixing manganese dioxide, plumbago and charcoal, moistening the said mixture with a concentrated solution of ammonium chloride, tightly compressing this depolarizing composition around a carbon positive electrode, providing in this agglomerate, channels designed to permit access of air into the depolarizing composition, evaporating the moistening liquid from the latter, covering the external surface of the depolarizing agglomerate with a previously pectized colloid.

3. A process of manufacturing positive electrodes with a solid depolarizer comprising preparing a depolarizing composition by mixing manganese dioxide, plumbago and charcoal, moistening the said mixture with a concentrated solution of ammonium chloride, tightly compressing this depolarizing composition around a carbon positive electrode, providing in this agglomerate, channels designed to permit access of air into the depolarizing composition, evaporating the moistening liquid from the latter, covering the external surface of the depolarizing agglomerate with cellophane.

4. A process of manufacturing positive electrodes with a solid depolarizer, consisting in providing channels in the depolarizing composition, said channels being adapted to permit access of air into the body of said depolarizing composition, evaporating the liquid contained in the pores of the depolarizing composition, and protecting the composition against penetration by the electrolytic liquid of the battery by providing said composition with an external coating comprising a pectized colloidal substance impermeable by liquids and permeable by gases.

5. A positive electrode with a solid depolarizer in a sub-divided state, said depolarizer being contained in a vessel and being constituted by a granular composition, the vessel permitting the outer air to penetrate therein, the particles of the composition being individually enveloped in a film constituted by a substance impervious to liquids and permeable by gases, and a colloidal coating applied on the inner face of said vessel so as to be in contact with the depolarizing composition.

6. A positive electrode with a solid depolarizer in a sub-divided state, said depolarizer being contained in a vessel and being constituted by a granular composition, the vessel permitting the outer air to penetrate therein, the particles of the composition being individually enveloped in a film constituted by a substance impervious to liquids and permeable by gases, and a colloidal coating applied on the inner face of said vessel so as to be in contact with the depolarizing composition, said vessel being constituted by a bag allowing the outer air to pass through it.

7. A positive electrode with a solid depolarizer in a sub-divided state, said depolarizer being contained in a vessel and being constituted by a granular composition, the vessel permitting the outer air to penetrate therein, the particles of the composition being individually enveloped in a film constituted by a substance impervious to liquids and permeable by gases, and a colloidal coating applied on the inner face of said vessel so as to be in contact with the depolarizing composition, said vessel being constituted by a porous receptacle open at its upper part so as to permit the outer air to enter therein.

8. A positive electrode with a solid depolarizer in a sub-divided state, said depolarizer being contained in a vessel and being constituted by a granular composition, the vessel permitting the outer air to penetrate therein, the particles of the composition being individually enveloped in a film constituted by a substance impervious to liquids and permeable by gases.

9. A positive electrode for electric batteries with a solid depolarizer composed of a granular material and protected against penetration of the electrolytic liquid by an external coating constituted by a colloidal substance impermeable by liquids and permeable by gases.

The foregoing specification of my "improvements in or relating to positive electrodes for electric batteries" signed by me this 18th day of December, 1924.

RENÉ OPPENHEIM.